(12) United States Patent
Nakane

(10) Patent No.: US 12,455,587 B2
(45) Date of Patent: Oct. 28, 2025

(54) PEDAL DEVICE FOR VEHICLE

(71) Applicant: TOYODA IRON WORKS CO., LTD., Toyota (JP)

(72) Inventor: Masataka Nakane, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 18/294,143

(22) PCT Filed: Nov. 8, 2022

(86) PCT No.: PCT/JP2022/041581
§ 371 (c)(1),
(2) Date: Jan. 31, 2024

(87) PCT Pub. No.: WO2023/085274
PCT Pub. Date: May 19, 2023

(65) Prior Publication Data
US 2024/0338047 A1 Oct. 10, 2024

(30) Foreign Application Priority Data
Nov. 10, 2021 (JP) .................................. 2021-183066

(51) Int. Cl.
*G05G 1/44* (2008.04)
(52) U.S. Cl.
CPC ..................................... *G05G 1/44* (2013.01)

(58) Field of Classification Search
None
See application file for complete search history.

(56) References Cited

U.S. PATENT DOCUMENTS

| 6,513,407 | B1 * | 2/2003 | Higgins | ................... G05G 1/30 |
| | | | | 74/560 |
| 9,958,896 | B2 * | 5/2018 | Kawahara | ................ G05G 1/44 |
| 2010/0058887 | A1 * | 3/2010 | Fujita | .................... G05G 1/506 |
| | | | | 74/512 |
| 2010/0180717 | A1 | 7/2010 | Himetani | |

FOREIGN PATENT DOCUMENTS

JP 2010170278 A 8/2010

* cited by examiner

Primary Examiner — Vicky A Johnson

(57) ABSTRACT

A vehicle pedal device includes a hollow pedal and a pin. The pin extends through a first hole and a second hole formed in the hollow pedal. The first hole is formed to have an inner diameter that corresponds to an outer diameter of the pin. The second hole includes an inner surface that includes a contact surface. The contact surface is configured to receive a reaction force from the pin when a user depresses the hollow pedal, thereby aligning a location of a rear end of the pin with a location of a rear end of an inner peripheral surface of the first hole in a front-rear direction of a vehicle. The second hole defines a space inside, the space being located frontward in the front-rear direction of the vehicle from the pin extending through the second hole.

5 Claims, 4 Drawing Sheets ated to the clevis and extends through a first hole formed in the first component and a second hole formed in the second component. The first hole is formed to have an inner diameter that corresponds to an outer diameter of the pin. The second hole includes an inner surface that includes a contact surface, the contact surface being configured to receive a reaction force from the pin when a user depresses the hollow pedal, thereby aligning a location of a rear end of the pin with a location of a rear end of an inner peripheral surface of the first hole in a front-rear direction of a vehicle. The second hole defines a space inside the second hole, the space being located frontward in the front-rear direction of the vehicle from the pin extending through the second hole.

PEDAL DEVICE FOR VEHICLE

TECHNICAL FIELD

The present disclosure relates to a vehicle pedal device.

BACKGROUND ART

A vehicle includes a pedal device as disclosed in Patent Literature 1. A user uses the pedal device to operate a vehicle. The pedal device includes a hollow pedal, a clevis, and a pin.

The hollow pedal includes brake pedals, clutch pedals, and accelerator pedals, among others. The hollow pedal is formed by joining a flat first component with a flat second component with a gap in between. The hollow pedal is pivotally supported by the vehicle body and operates to pivot in an operation direction when depressed by a user. The clevis transmits the movement of the hollow pedal in the operation direction to another device. The pin is rotatably connected to the clevis and extends through a first hole formed in the first component and a second hole formed in the second component.

When the hollow pedal, depressed by the user, moves in the operation direction, the movement is transmitted to another device by the pin and the clevis. In this case, the inner surface of the first hole and the inner surface of the second hole receive a reaction force from the pin as the hollow pedal is depressed by the user. The reaction force is received by the inner surface of the first hole and the inner surface of the second hole. This ensures the strength of the hollow pedal against the reaction force. When the first hole and the second hole have inner diameters that are substantially the same as the outer diameter of the pin, loosening of the pin in the first hole and the second hole is restricted when receiving a reaction force from the pin or the like as described above.

CITATION LIST

Patent Literature

Patent Literature 1: Japanese Laid-Open Patent Publication No. 2010-170278

SUMMARY OF INVENTION

Technical Problem

When the clevis and the pin are assembled with the hollow pedal, the pin is positioned in relation to the first hole and the second hole, and in this state, the pin is sequentially inserted through the first hole and the second hole. However, since the inner diameters of the first hole and the second hole are substantially the same as the outer diameter of the pin, inserting the pin through the first hole and the second hole is challenging. As a result, the assembly of the clevis and the pin with the hollow pedal is burdensome.

Solution to Problem

A vehicle pedal device according to one aspect of the present embodiment includes a hollow pedal, a clevis, and a pin. The hollow pedal is formed by joining a first component with a second component with a gap in between. The clevis is configured to transmit movement of the hollow pedal to another device. The pin is rotatably connected to the clevis

DESCRIPTION OF EMBODIMENTS

A vehicle pedal device according to one embodiment will now be described with reference to FIGS. 1 to 3. In the following description, front and rear are defined based on the front-rear direction of the vehicle.

Figure 2:
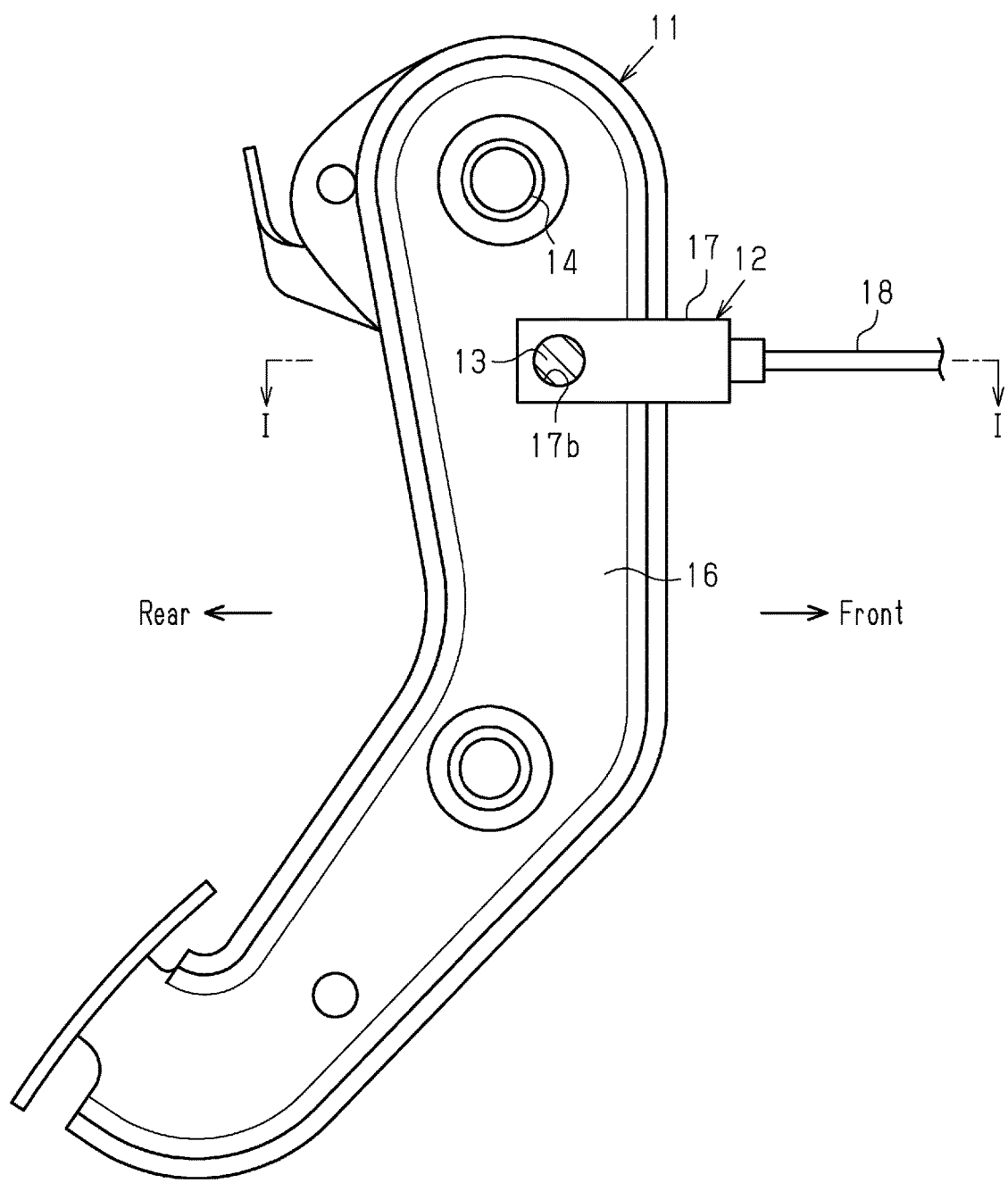
FIG. 2 is a side view of the pedal device in FIG. 1.

As shown in FIG. 2, the pedal device includes a hollow pedal 11, a clevis 12, and a pin 13. The hollow pedal 11 serves as, for example, a brake pedal.

A rotary shaft 14 is arranged at one end of the hollow pedal 11 in the longitudinal direction, specifically, the upper end of the hollow pedal 11 in FIG. 2. The rotary shaft 14 extends in the width direction of the vehicle. The hollow pedal 11 is supported by the vehicle body with the rotary shaft 14. The hollow pedal 11 is pivotal about the central axis of the rotary shaft 14. The hollow pedal 11, when depressed by a user, operates to pivot about the central axis of the rotary shaft 14 in an operation direction toward the front of the vehicle.

The clevis 12 is configured to transmit the movement of the hollow pedal 11 in the operation direction to another device, for example, a brake booster. The clevis 12 is connected to the hollow pedal 11 by the pin 13 at a location spaced apart from the rotary shaft 14 of the hollow pedal 11, specifically, below the rotary shaft 14 in FIG. 2. The pin 13 is rotatably connected to the clevis 12 and extends through the hollow pedal 11 in the same direction as the rotary shaft 14. When the hollow pedal 11, depressed by the user, moves in the operation direction, the movement is transmitted to another device such as the brake booster by the pin 13 and the clevis 12. In this case, the hollow pedal 11 receives a reaction force from the pin 13.

Figure 1:
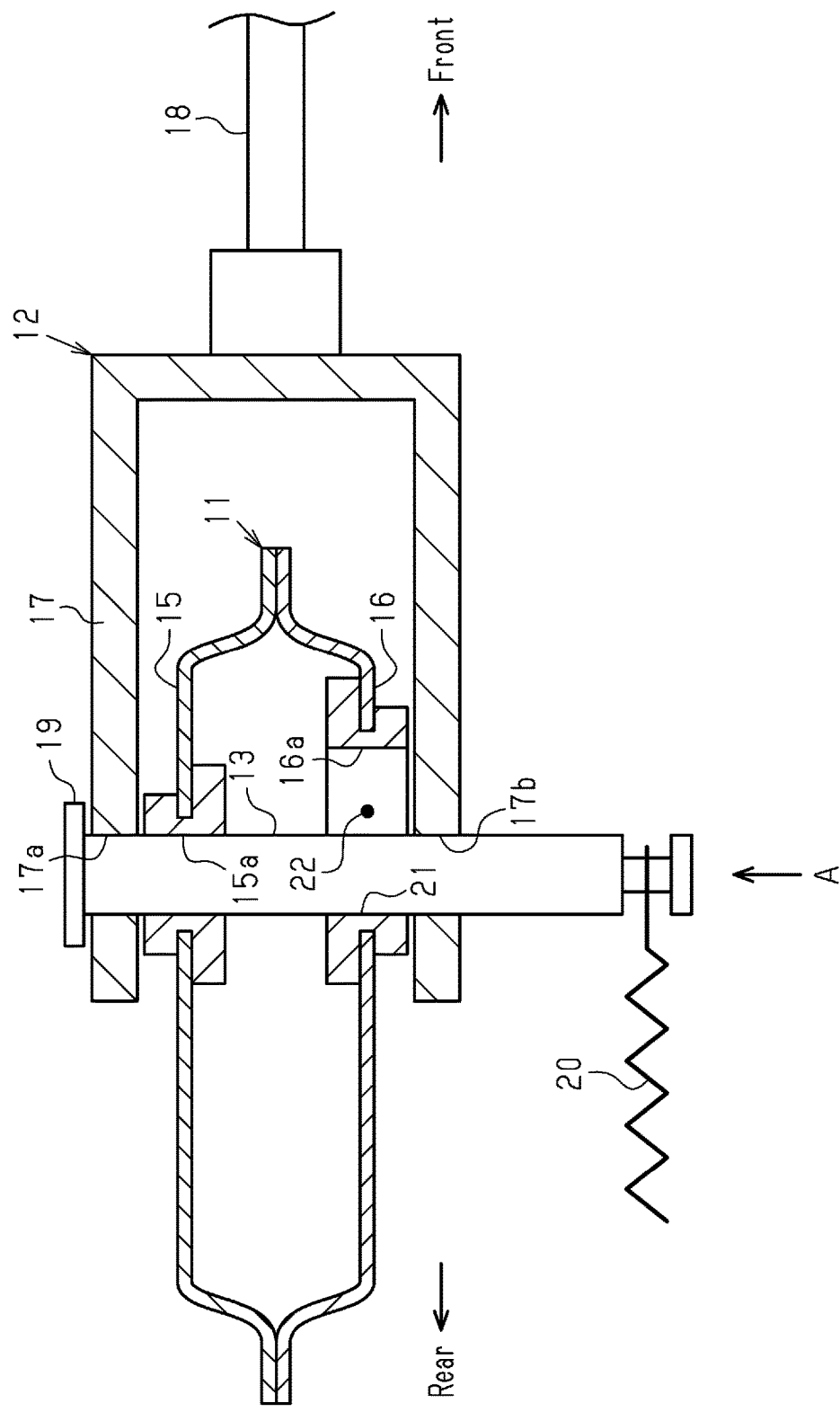
FIG. 1 is a cross-sectional view taken along line I-I in FIG. 2, illustrating a hollow pedal, a clevis, and a pin of a pedal device.

FIG. 1 schematically shows the hollow pedal 11, the clevis 12, and the pin 13 in the cross-section taken along line I-I in FIG. 2. As shown in FIG. 1, the hollow pedal 11 is formed by joining a flat first component 15 with a flat second component 16 with a gap in between. The first component 15 includes a first hole 15*a*. The second component 16 includes a second hole 16*a*. The pin 13 is inserted through the first hole 15*a* and the second hole 16*a*.

The clevis 12 includes a holding portion 17 and a push rod 18. The holding portion 17 holds the hollow pedal 11 from the outer sides of the first component 15 and the second component 16. The holding portion 17 is arranged to face the first hole 15*a* of the first component 15 and the second hole 16*a* of the second component 16. The holding portion 17 includes a hole 17*a* and a hole 17*b*. The hole 17*a* corresponds to the first hole 15*a*. The hole 17*b* corresponds to the second hole 16*a*. The push rod 18 projects from the holding portion 17 toward the opposite side of the hollow pedal 11.

The pin 13 extends through the holes 17*a* and 17*b* of the holding portion 17 of the clevis 12 and is rotatably connected to the clevis 12. The pin 13 includes a flange 19 at a first end, specifically, the upper end of the pin 13 in FIG. 1. The flange 19 projects from the outer surface of the pin 13 in the radial direction of the pin 13. The first end of the pin 13 extends through the first hole 15*a*, and a second end of the pin 13 opposite to the first end extends through the second hole 16*a*. The second end of the pin 13 is connected to a spring 20. The spring 20 biases the pin 13 in a direction opposite to the direction in which the push rod 18 projects from the holding portion 17.

The first hole 15*a* and the second hole 16*a* of the hollow pedal 11 will now be described in detail.

First Hole 15*a*

The first hole 15*a* is formed to have an inner diameter that corresponds to the outer diameter of the pin 13. Specifically, the inner diameter of the first hole 15*a* is set to be substantially the same as the outer diameter of the pin 13, or slightly greater than the outer diameter of the pin 13, considering the ease of insertion of the pin 13 and the restriction of loosening of the pin 13. The inner diameter of the first hole 15*a* being the same as the outer diameter of the pin 13 includes a case in which the inner diameter of the first hole 15*a* is greater than the outer diameter of the pin 13 so that the pin 13 can be inserted through the first hole 15*a* and loosening of the pin 13 in the first hole 15*a* is within a permissible range.

Second Hole 16*a*

Figure 3:
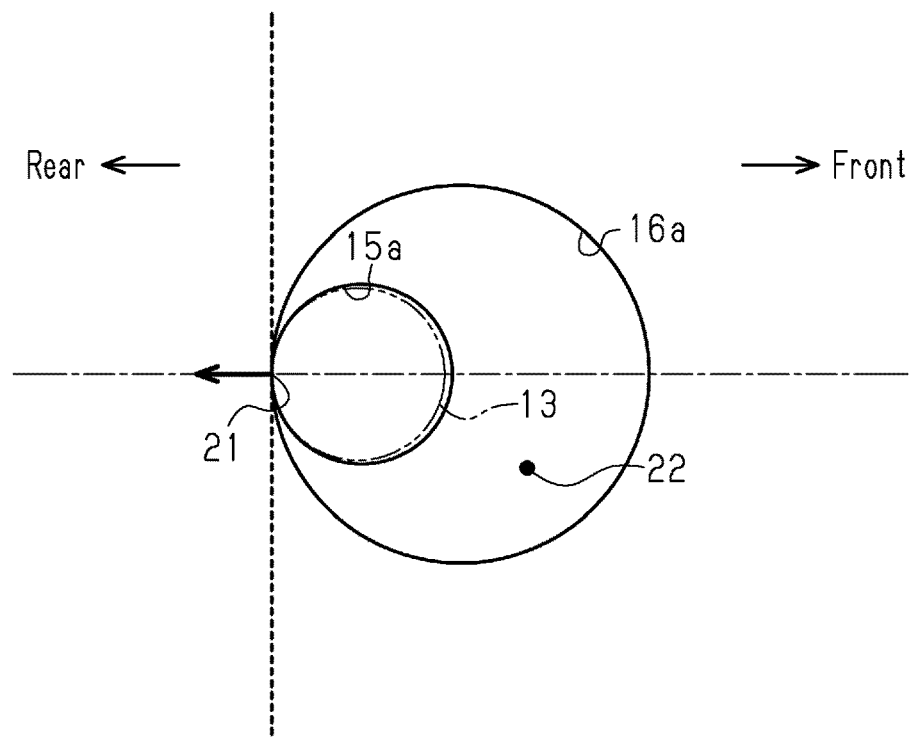
FIG. 3 is a side view showing a first hole and a second hole of the hollow pedal as viewed from the direction of arrow A in FIG. 1.

FIG. 3 shows the first hole 15*a* and the second hole 16*a* as viewed from the direction of arrow A in FIG. 1. As shown in FIG. 3, the second hole 16*a* is larger than the first hole 15*a*. Specifically, the second hole 16*a* is shaped to be circular with a greater diameter than the first hole 15*a*. The rear end of the inner surface of the second hole 16*a*, that is, the left end in FIG. 3 serves as a contact surface 21 that receives a reaction force from the pin 13, as indicated by the arrow in FIG. 3, when the user depresses the hollow pedal 11.

The contact surface 21 is configured to align the location of the rear end of the pin 13 with the location of the rear end of the inner peripheral surface of the first hole 15*a* when receiving the reaction force from the pin 13. The broken line in FIG. 3 indicates the location of the rear end of the inner peripheral surface of the first hole 15*a*. The second hole 16*a* defines a space 22 inside second hole 16*a*. The space 22 is located frontward from the pin 13, extending through the second hole 16*a*, that is, rightward in FIG. 3.

The assembly of the clevis 12 and the pin 13 with the hollow pedal 11 will now be described.

When the clevis 12 and the pin 13 are assembled with the hollow pedal 11, first, the second end of the pin 13 is inserted into the hole 17*a* of the holding portion 17 in the clevis 12. In this state, the holding portion 17 is arranged to hold the hollow pedal 11 so that the pin 13 is positioned in relation to the first hole 15*a* and the second hole 16*a* of the hollow pedal 11.

Then, the pin 13 is inserted through the first hole 15*a* of the first component 15, and the pin 13 is further inserted through the second hole 16*a* of the second component 16. The second hole 16*a* is larger than the first hole 15*a* to define the space 22 inside the second hole 16*a*. As a result, the insertion of the pin 13 through the second hole 16*a* is easier than the insertion of the pin 13 through the first hole 15*a*. The pin 13, inserted through the first hole 15*a* and the second hole 16*a*, is also inserted into the hole 17*b* of the holding portion 17 in the clevis 12. The clevis 12 and the pin 13 are assembled with the hollow pedal 11 in this manner.

The hollow pedal 11 is attached to the body of the vehicle. At this time, the spring 20 is connected to the second end of the pin 13, and the flange 19 of the pin 13 is in contact with the holding portion 17 of the clevis 12. Thus, the pin 13 stays in place within the first hole 15*a* and the second hole 16*a*.

The pedal device according to the present embodiment has the advantages described below.

(1) The space 22 defined inside the second hole 16*a* is located frontward from the pin 13 extending through the second hole 16*a*. In other words, the inner diameter of the second hole 16*a* is greater than the outer diameter of the pin 13, allowing the pin 13 to be easily inserted through the second hole 16*a*. Thus, when the clevis 12 and the pin 13 are assembled with the hollow pedal 11, the pin 13 is easily inserted through the first hole 15*a* and the second hole 16*a* sequentially. This reduces the effort required for assembling the clevis 12 and the pin 13 with the hollow pedal 11.

When the user depresses the hollow pedal 11, the reaction force from the pin 13 generated by the depression is received by the contact surface 21 of the second hole 16*a* and the rear end of the inner peripheral surface of the first hole 15*a*. This ensures the strength of the hollow pedal 11 against the reaction force. The inner diameter of the first hole 15*a* corresponds to the outer diameter of the pin 13. This restricts loosening of the pin 13 in the first hole 15*a* and the second hole 16*a* when the hollow pedal 11 receives the reaction force from the pin 13 or the like.

(2) Since the second hole 16*a* defining the space 22 is circular, the second hole 16*a* is easily formed together with the space 22.

(3) The first end of the pin 13 including the flange 19 extends through the first hole 15*a* of the hollow pedal 11. The second end of the pin 13 extends through the second hole 16*a* of the hollow pedal 11. Thus, when the pin 13 is assembled with the hollow pedal 11, the pin 13 is sequentially inserted through the first hole 15*a* and the second hole 16*a*. Specifically, after the second end of the pin 13 is inserted through the first hole 15*a*, the second end is inserted through the second hole 16*a*, which is larger than the first hole 15*a*. Thus, the pin 13 is first inserted through the first hole 15*a*, which is challenging, and then the pin 13 is inserted through the second hole 16*a*, which is less challenging. This facilitates the assembly of the clevis 12 and the pin 13 with the hollow pedal 11.

The above-described embodiment may be modified as follows. The above-described embodiment and the following modification can be combined if the combined modifications remain technically consistent with each other.

Figure 4:
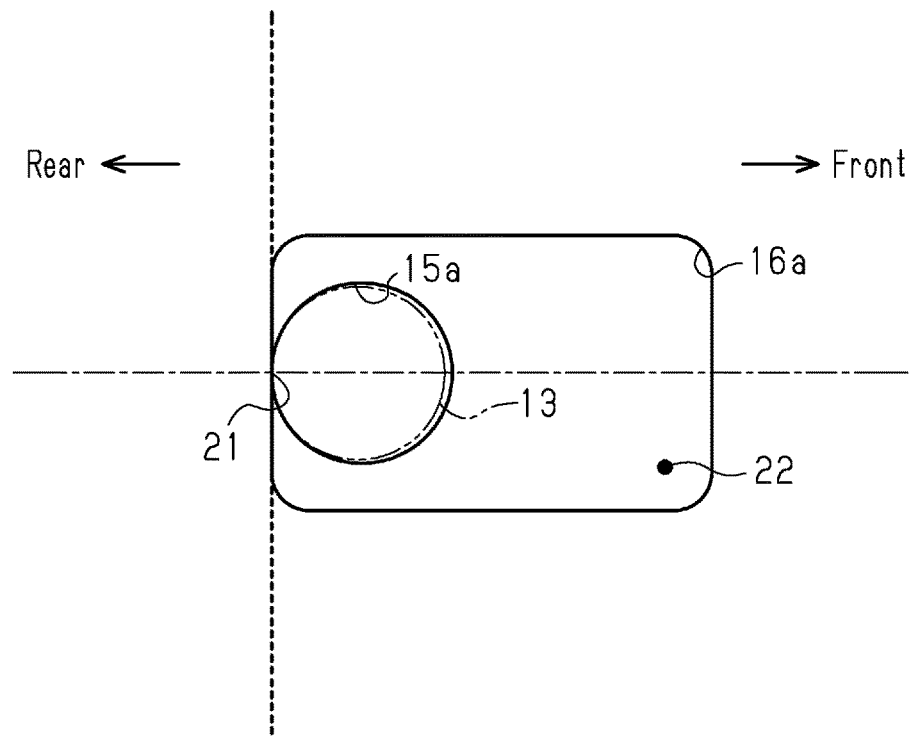
FIG. 4 is a schematic view showing a first modification of the second hole in FIG. 3.
Figure 5:
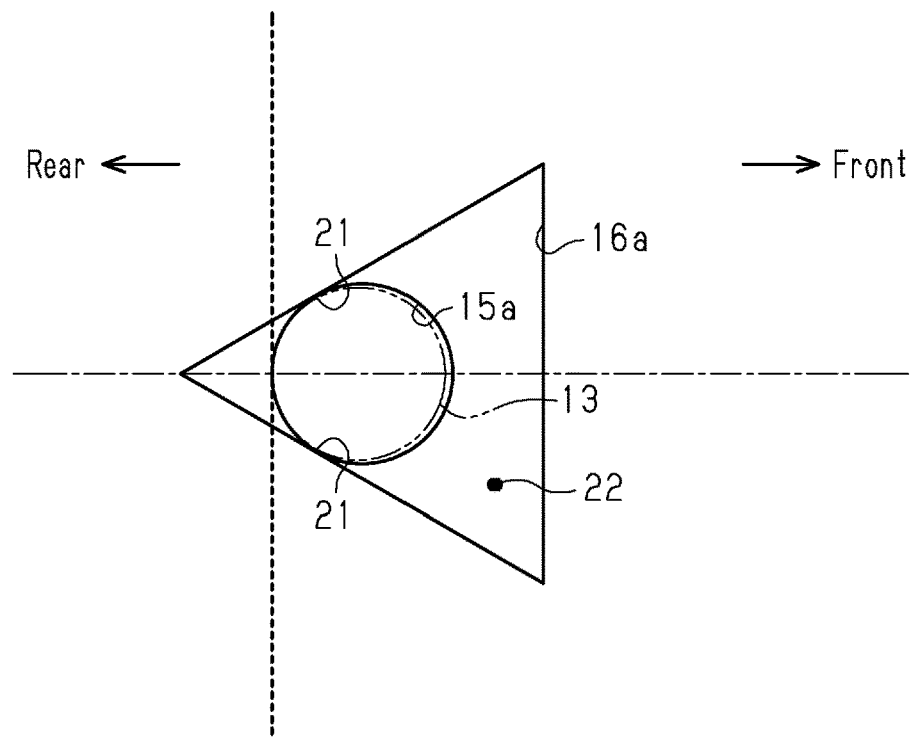
FIG. 5 is a schematic view showing a second modification of the second hole in FIG. 3.
Figure 6:
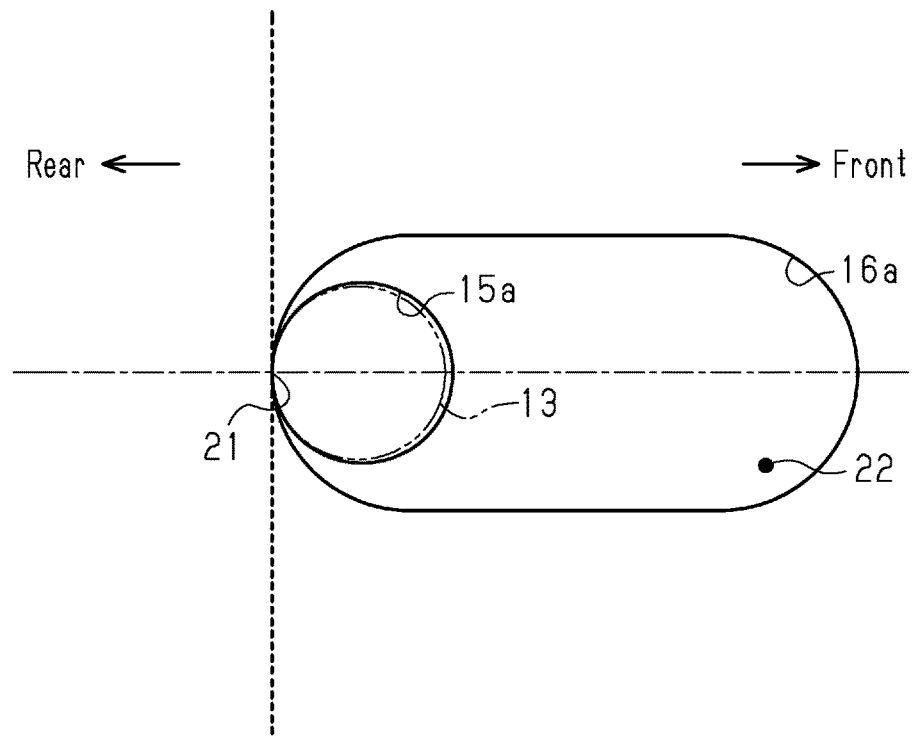
FIG. 6 is a schematic view showing a third modification of the second hole in FIG. 3.

The second hole 16*a* may have a shape other than a circular shape as shown in, for example, FIGS. 4, 5, and 6. In this case, the location of the contact surface 21 in the second hole 16*a* is adjusted in accordance with the shape of the second hole 16*a*. The broken lines in FIGS. 4, 5, and 6 indicate the location of the rear end of the inner peripheral surface of the first hole 15a. In the examples in FIGS. 3, 4, and 6, the location of the contact surface 21 of the second hole 16a is the same as the location of the rear end of the inner peripheral surface of the first hole 15a in the front-rear direction of the vehicle. In contrast, in the example in FIG. 5, where the second hole 16a is shaped to be triangular, the inner surface of the second hole 16a includes two contact surfaces 21, and locations of the contact surfaces 21 are arranged frontward from the location of the rear end of the inner peripheral surface of the first hole 15a in the front-rear direction of the vehicle.

The hollow pedal 11 may be an accelerator pedal, a clutch pedal, or the like instead of the brake pedal.

The pin 13 may be inserted through the first hole 15a and the second hole 16a in a direction opposite to the direction in the above-described embodiment. In other words, the first end of the pin 13 including the flange 19 may extend through the second hole 16a, and the second end of the pin 13 may extend through the first hole 15a.

The invention claimed is:

1. A vehicle pedal device, comprising:
   a hollow pedal;
   a clevis; and
   a pin, wherein
   the hollow pedal is formed by joining a first component with a second component with a gap in between,
   the clevis is configured to transmit movement of the hollow pedal to another device,
   the pin is rotatably connected to the clevis and extends through a first hole formed in the first component and a second hole formed in the second component,
   the first hole is formed to have an inner diameter that corresponds to an outer diameter of the pin,
   the second hole includes an inner surface that includes a contact surface, the contact surface being configured to receive a reaction force from the pin when a user depresses the hollow pedal, thereby aligning a location of a rear end of the pin with a location of a rear end of an inner peripheral surface of the first hole in a front-rear direction of a vehicle, and
   the second hole defines a void space inside the second hole, the void space being located frontward in the front-rear direction of the vehicle from the pin extending through the second hole.

2. The vehicle pedal device according to claim 1, wherein the contact surface of the second hole and the rear end of the inner peripheral surface of the first hole are each configured to receive the reaction force from the pin.

3. The vehicle pedal device according to claim 1, wherein
   the second hole is shaped to be circular with a greater diameter than the first hole, and
   the contact surface of the second hole is located at a rear end of the inner surface of the second hole in the front-rear direction of the vehicle.

4. The vehicle pedal device according to claim 1, wherein
   the pin includes a first end including a flange and a second end that is opposite to the first end,
   the first end extends through the first hole, and
   the second end extends through the second hole.

5. The vehicle pedal device according to claim 1, wherein
   a distance between a rear end of the inner surface of the second hole and the pin is equal to a distance between the rear end of the inner peripheral surface of the first hole and the pin, and
   a distance between a front end of the inner surface of the second hole and the pin is greater than a distance between a front end of the inner peripheral surface of the first hole and the pin.

* * * * *